US012729798B2

(12) United States Patent
Kamiyama et al.

(10) Patent No.: US 12,729,798 B2
(45) Date of Patent: Sep. 8, 2026

(54) PIPE REHABILITATION METHOD

(71) Applicant: SHONAN GOSEI-JUSHI SEISAKUSHO K.K., Hiratsuka (JP)

(72) Inventors: Takao Kamiyama, Hiratsuka (JP); Makoto Ishida, Hiratsuka (JP)

(73) Assignee: SHONAN GOSEI-JUSHI-SEISAKUSHO K. K., Hiratsuka (JP)

( * ) Notice: Subject to any disclaimer, the term of this patent is extended or adjusted under 35 U.S.C. 154(b) by 407 days.

(21) Appl. No.: 18/281,380

(22) PCT Filed: Feb. 24, 2022

(86) PCT No.: PCT/JP2022/007455
§ 371 (c)(1),
(2) Date: Sep. 11, 2023

(87) PCT Pub. No.: WO2022/219938
PCT Pub. Date: Oct. 20, 2022

(65) Prior Publication Data

US 2024/0151342 A1 May 9, 2024

(30) Foreign Application Priority Data

Apr. 13, 2021 (JP) ................................ 2021-068027

(51) Int. Cl.
*F16L 55/165* (2006.01)

(52) U.S. Cl.
CPC ................................ *F16L 55/1657* (2013.01)

(58) Field of Classification Search
CPC ... F16L 55/1657; F16L 55/165; F16L 55/164; F16L 1/038; E03F 3/06; E03F 2003/065; E21D 11/04; F16B 19/1081
See application file for complete search history.

(56) References Cited

U.S. PATENT DOCUMENTS 8,240,339 B2 * 8/2012 Kamiyama ............... E03F 3/06 405/184.2
8,360,684 B2 * 1/2013 Kamiyama ......... F16L 55/1657 405/153

(Continued)

FOREIGN PATENT DOCUMENTS

JP S59-141699 A 8/1984
JP 2005-147371 A 6/2005

(Continued)

OTHER PUBLICATIONS

International Search Report for PCT/JP2022/007455 dated May 10, 2022.

*Primary Examiner* — David Bochna
(74) *Attorney, Agent, or Firm* — MOSER TABOADA

(57) ABSTRACT

A coupler having elastically deformable claws 32, 33 is fixed to the side plate 103 of one segment 1*a*. The side plate 103 of the one segment 1*a* and the side plate 102 of the other segment 1*b* are butted against each other, and the claws of the coupler are passed through the side plate of the other segment to protrude into the segment. The claws of the coupler protruding into the other segment are elastically deformed by a diameter expansion pin 11 to expand the diameter of the claws 32 and 33. The claws of the coupler whose diameter has been expanded presses the side plate of the other segment against the side plate of the one segment to couple both the segments in the longitudinal direction.

10 Claims, 18 Drawing Sheets

(56) References Cited

U.S. PATENT DOCUMENTS

| | | | | |
|---|---|---|---|---|
| 9,797,539 | B1 * | 10/2017 | Kamiyama ......... | F16L 55/1657 |
| 2021/0025532 | A1 * | 1/2021 | Hasegawa ........... | F16L 55/1657 |
| 2021/0041050 | A1 * | 2/2021 | Kamiyama ........... | F16L 55/165 |
| 2024/0240740 | A1 * | 7/2024 | Kamiyama ......... | F16L 55/1657 |

FOREIGN PATENT DOCUMENTS

| | | | |
|---|---|---|---|
| JP | 2005-299711 | A | 10/2005 |
| JP | 2006-057666 | A | 3/2006 |
| JP | 2009-108484 | A | 5/2009 |
| JP | 2010-101390 | A | 5/2010 |
| JP | 2011-012803 | A | 1/2011 |
| JP | 2017-227255 | A | 12/2017 |

* cited by examiner

PIPE REHABILITATION METHOD

TECHNICAL FIELD

The present invention relates to a pipe rehabilitation method for installing a rehabilitation pipe inside an existing pipe in which segments are coupled in the circumferential direction and in the longitudinal direction, each of the segments being formed integrally from a plastic material and comprising an inner surface plate constituting an inner circumferential surface and side plates and end plates provided upright on peripheral edges of the inner surface plate.

BACKGROUND ART

In cases in which a pipeline such as a sewage pipe buried underground has deteriorated through aging, a pipe lining method has been proposed and practiced in which a lining is provided to the inner circumferential surface thereof to repair the pipeline without excavating it from the ground.

In cases in which large-diameter pipelines are to be rehabilitated, segments are used each of which comprises an inner surface plate constituting an inner circumferential surface, and side plates and end plates provided upright on the peripheral edges of the inner surface plate, these plates being integrally formed from a plastic material. The segments are coupled in the circumferential direction to assemble a pipe unit. The pipe units are coupled in the longitudinal direction using a coupling bolt to assemble a rehabilitation pipe inside an existing pipe.

Patent Document 1 below discloses a configuration in which long coupling bolts that longitudinally extend between both side plates of the segment are used, the coupling bolts being fixed to the segments and coupled to each other to couple the segments in longitudinal direction.

Patent Document 2 below describes a configuration in which a nut is fixed to one segment, and a coupling bolt is passed through the other segment and screwed into the nut fixed to the one segment, thereby coupling both the segments in the longitudinal direction.

Patent Document 3 below describes a configuration in which a coupling pin having two ridges formed on its outer periphery is separated into halves by a separation pin, and the side plates of two segments to be coupled are clamped between the ridges to couple both the segments in the longitudinal direction.

PRIOR ART DOCUMENTS

Patent Documents

Patent Document 1: JP 2005-299711 A
Patent Document 2: JP 2011-012803 A
Patent Document 3: JP 2010-101390 A

SUMMARY OF INVENTION

Problems to be Solved

In the segment coupling method as described in Patent Document 1, the coupling bolts are coupled to each other in the longitudinal direction. This provides a long rod-shaped member that couples the segments in the longitudinal direction. Therefore, the segment portions where the coupling bolts are provided are firmly joined, but the portions where the coupling bolts are not provided cannot be joined in longitudinal direction with sufficient strength.

On the other hand, in the segment coupling method as described in Patent Document 2, the nuts are staggered for fixation in the circumferential direction, so that the coupling bolts are disposed in a zigzag manner, allowing the segments to be joined with sufficient strength. However, the nut is so long as to extend between the side plate of the segment and the inner plate adjacent thereto. Therefore, it is necessary to elongate a threaded portion that engages with the threaded portion of the coupling bolt. There occurred a problem that it required an expensive nut.

In addition, the nut described in Patent Document 2 is long in the longitudinal direction, so that it must be fixed by bolting one end of the nut to the inner plate adjacent to the side plate of the segment. Therefore, a dedicated tool with torque control is required for nut installation. Furthermore, it is necessary to loosen the bolts and re-attach the nut to the correct position when the nut is installed in wrong position. There occurred a problem that it required time for replacement work.

In the configuration described in Patent Document 3, the ridges formed on the outer periphery of the coupling pin cannot be elongated in the radial direction from the outer peripheral surface, so that the ridges are made low. There occurred a problem that both the segments could not be clamped with sufficient force.

The present invention has been made to solve such problems, and an object thereof is to provide a pipe rehabilitation method capable of firmly coupling segments in the longitudinal direction in a short time without using fixtures such as bolts and nuts.

Means for Solving the Problems

The present invention provides a pipe rehabilitation method in which segments each including an inner surface plate, side plates that are provided upright on both sides extending in the circumferential direction of the inner surface plate and have insertion holes formed thereon, and inner plates that are provided upright on the upper surface of the inner surface plate inside the side plates and have insertion holes formed thereon are coupled in the longitudinal direction while the side plates of the segments are butted against each other to install a rehabilitation pipe inside an existing pipe, the method comprising:

preparing a coupler having a plurality of claws that are radially elastically deformable and long so as to protrude through the insertion holes of the side plates of the butted segments;

fixing the coupler to one segment so that the claws pass through the insertion hole of the side plate of the one segment and protrude to the outside;

inserting the claws of the coupler projecting from the side plate of the one segment into the insertion hole of the side plate of the other segment that is butted against the one segment, the side plates of both the segments being butted together to protrude the claws of the coupler into the other segment;

elastically deforming the claws of the coupler protruding into the other segment to expand the claws in diameter; and pressing the side plate of the other segment against the side plate of the one segment by the claws of the coupler whose diameter has been expanded to clamp both the side plates and couple the one and the other segments in the longitudinal direction.

Effect of the Invention

According to the present invention, the elastically deformable claws of the coupler are passed through the side plates of the butted segments and are expanded in diameter, and both the segments are clamped and coupled in the longitudinal direction by the diameter-expanded claws of the coupler. Therefore, the segments can be coupled in the longitudinal direction in a short time. In addition, the coupler is fixed to the segment, so that before the segment is transported to a construction site, the coupler can be attached thereto in a state in which the claws can be expanded in diameter, thereby significantly shortening the construction time at the site.

MODE OF CARRYING OUT THE INVENTION

The present invention will now be described with references to embodiments illustrated in the accompanying drawings. The present invention is suitable for rehabilitating or repairing large-diameter existing pipes such as sewage pipes, water supply pipes, tunnels, or agricultural irrigation channels. In the present embodiment, the rehabilitation pipes are described as having a circular cross-section profile perpendicular to the longitudinal direction. However, it shall be apparent that the present invention can be applied to a rehabilitation pipe having a square or another non-circular shape. Also, in addition to shapes in which the cross-section profile is closed as a pipe, a horseshoe-shape, a semi-circular shape, a U-shape or the like in which one side is open can also be considered to be a pipe, and the present invention can also be applied thereto.

Figure 2:
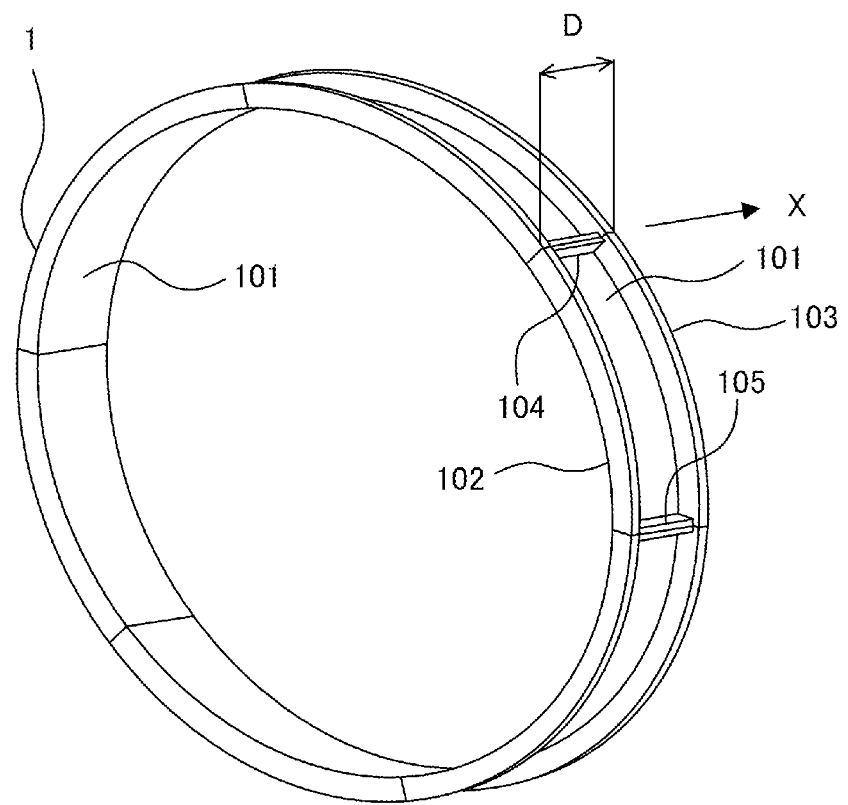
FIG. 2 is a perspective view showing a state in which the segments are coupled in the circumferential direction to assemble a pipe unit.

In the present specifications, the longitudinal direction refers to the direction indicated by arrow X extending in the pipe-length direction of a pipe unit 10 in FIG. 2, and the circumferential direction refers to the direction of the circumference of the circle forming the pipe unit 10.

Figure 1:
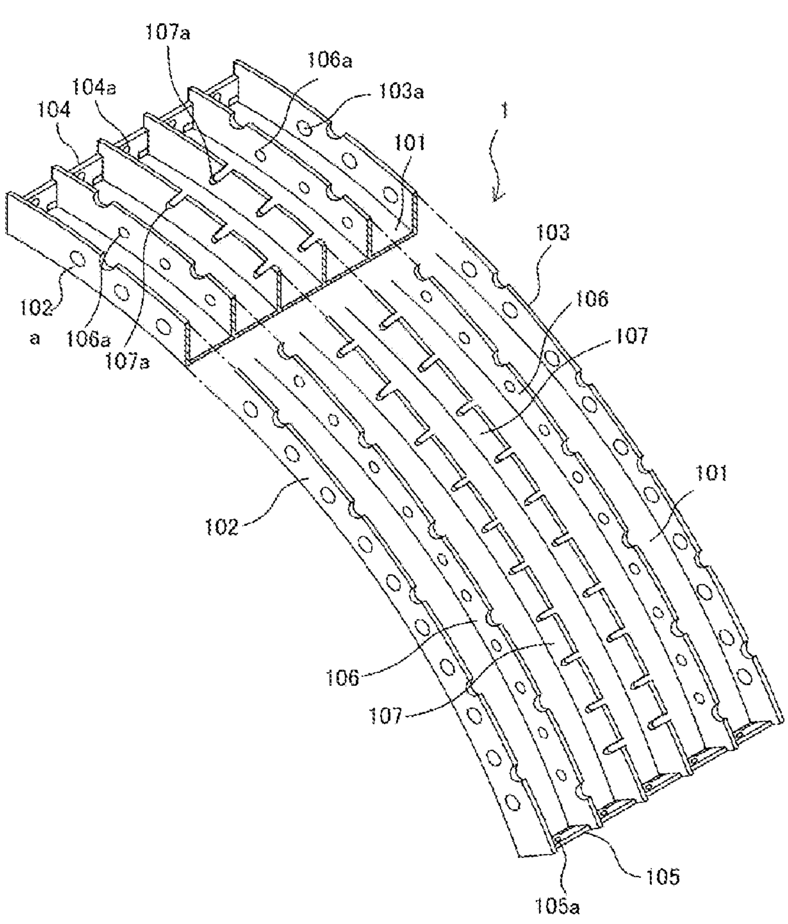
FIG. 1 is a perspective view showing the structure of a segment used in assembling a rehabilitation pipe.

FIG. 1 shows the structure of a segment 1 for a rehabilitation pipe (hereafter simply referred to as "segment"). The segment 1 is an integrally formed block-shaped member made from a plastic material, comprising an inner surface plate 101 constituting an inner circumferential surface of the rehabilitation pipe, side plates 102, 103 with the same thickness provided vertically upright on both sides extending in the circumferential direction of the inner surface plate 101, and end plates 104, 105 provided vertically upright on both ends extending in the longitudinal direction of the inner surface plate 101.

In order to reinforce the mechanical strength of the segment 1, a plurality of inner plates 106, 107 having a shape similar to and the same or slightly thinner thickness as the side plates 102, 103 are provided upright at equal intervals and parallel thereto on the upper surface of the inner surface plate 101 inside the side plates 102, 103.

The segment 1 has a shape that is curved as an arc representing a predetermined angle that equally divides the circumference, e.g., a 60° arc that divides the circumference into sixths. However, the segment may be shaped as, e.g., a cuboid or a shape that is bent so as to have a curved right angle depending on the cross-section profile or the size of the existing pipe or the location of the existing pipe to be repaired.

In order to couple the segments 1 in the longitudinal direction, a plurality of circular insertion holes 102*a*, 103*a* for admitting insertion of a diameter expansion pin 11, which will be described later, are provided at equal intervals along the circumference on the side plates 102, 103. A plurality of circular insertion holes 106*a* smaller in diameter than the insertion holes 102*a*, 103*a* for admitting insertion of the diameter expansion pin 11 are also provided at equal intervals on the inner plate 106. A plurality of notches are provided at equal intervals on the inner plate 107 to provide a function as an insertion hole 107*a* through which the diameter expansion pin can pass. The insertion holes 102*a*, 103*a*, 106*a* and 107*a* are located at coinciding positions along the circumferential direction.

The end plates 104 and 105 are members disposed in the longitudinal direction on both ends of the side plates 102 and 103. A plurality of circular insertion holes 104*a* and 105*a* are provided on the end plates 104 and 105 for admitting insertion of coupling means such as bolts to couple the segments 1 in the circumferential direction.

The end plate 105 of the segment 1 is aligned with and brought into contact with the end plate 104 of another segment. A bolt 6 and a nut 7 (FIG. 3) are passed through the insertion holes 104*a* and 105*a* and screwed together for coupling in the circumferential direction.

By sequentially coupling the segments in the circumferential direction around the full circumference, it is possible to assemble a ring-shaped pipe unit 10 having a predetermined length D in the longitudinal direction X as shown in FIG. 2. The outside diameter of the pipe unit 10 is slightly smaller than the inside diameter of the existing pipe to be rehabilitated. In FIG. 2, the inner surface plate 101, the side plates 102, 103, and the end plates 104, 105, which are the principal structural members of the segment 1, are shown. In order to avoid complication, reinforcement structures such as the inner plates 106, 107 are omitted from the drawing.

Figure 3:
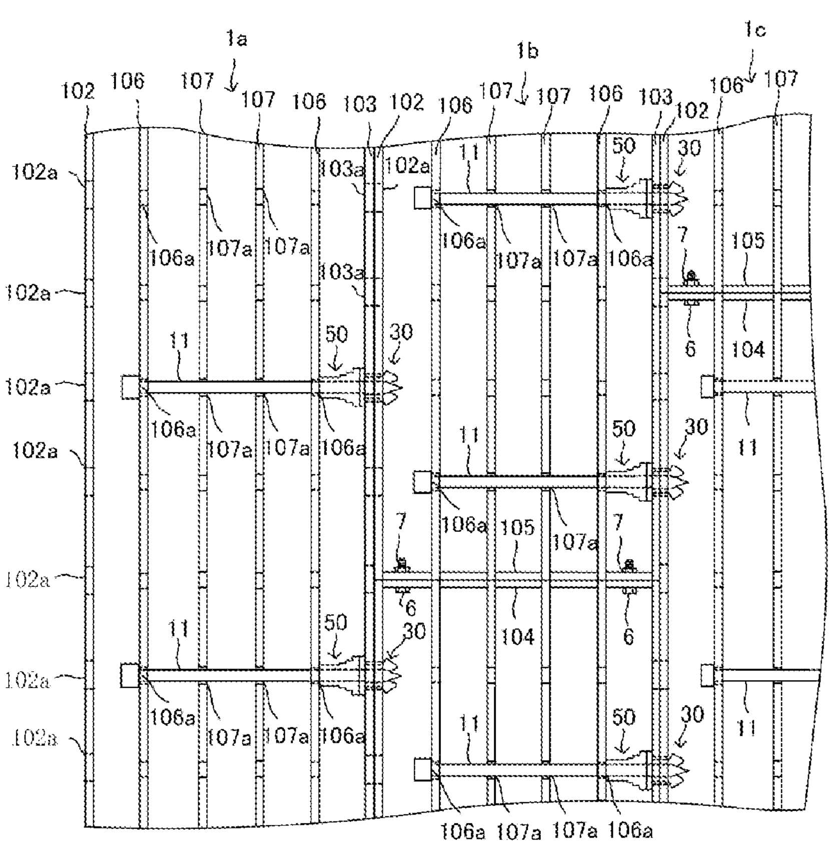
FIG. 3 is an illustrative view showing a state in which the segments are coupled in the longitudinal direction.
Figure 4A:
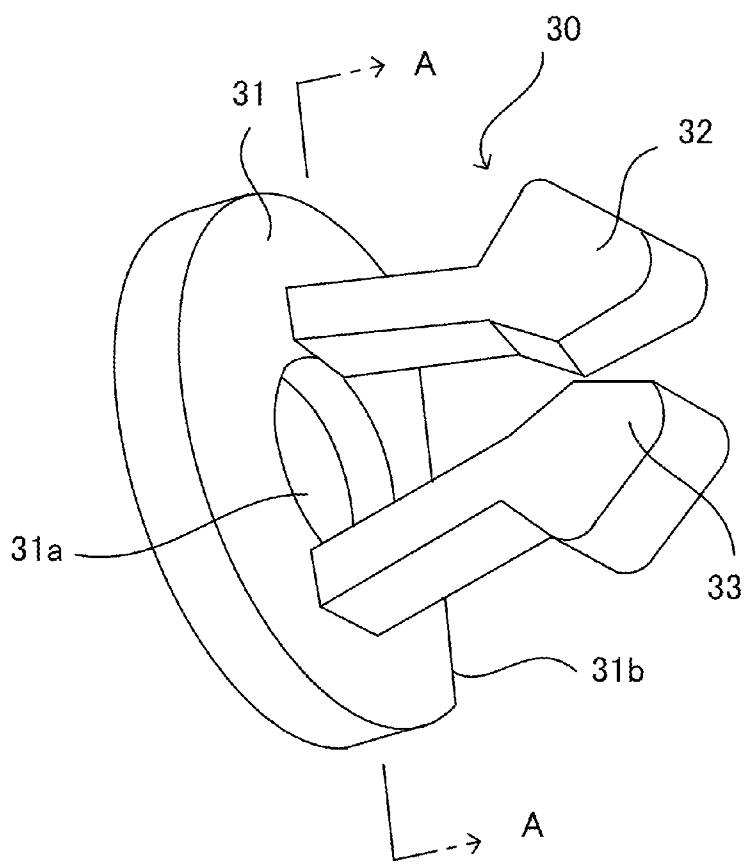
FIG. 4*a* is a perspective view of a coupler that couples the segments.
Figure 4B:
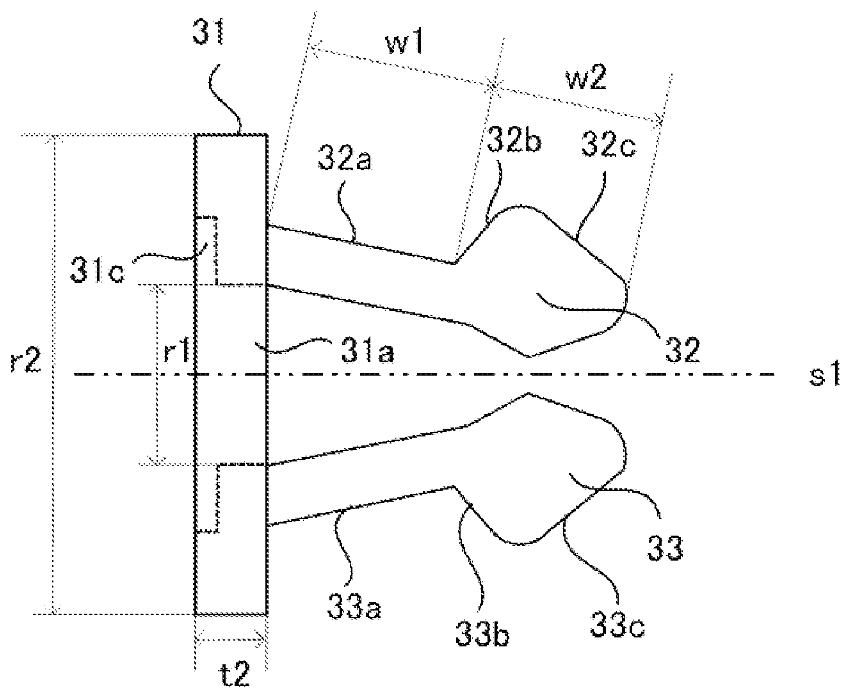
FIG. 4*b* is a top view of the coupler that couples the segments.
Figure 4C:
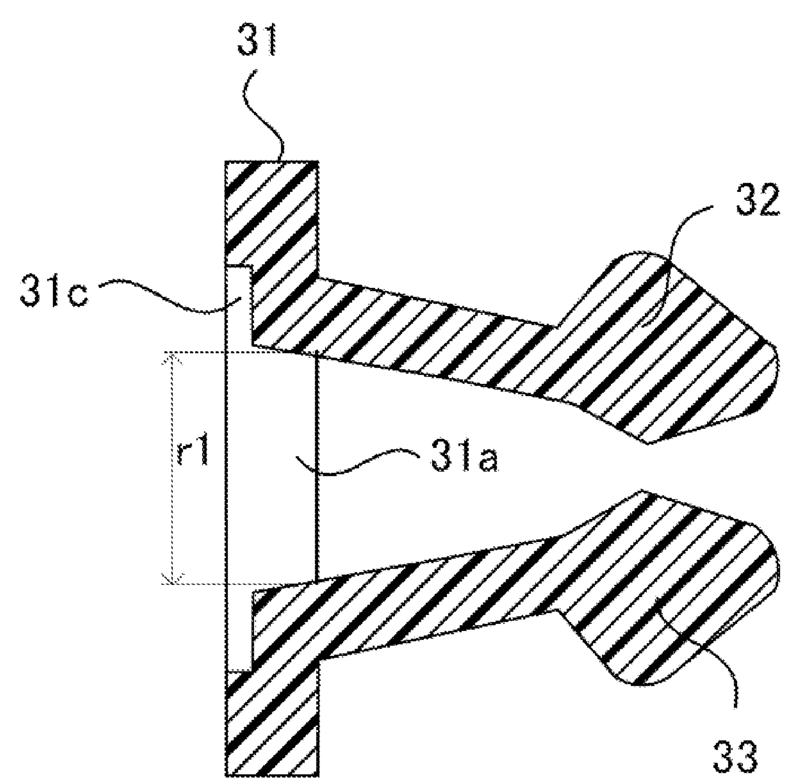
FIG. 4*c* is a cross-sectional view of the coupler along line A-A of FIG. 4*a* through the center of an insertion hole thereof.
Figure 4D:
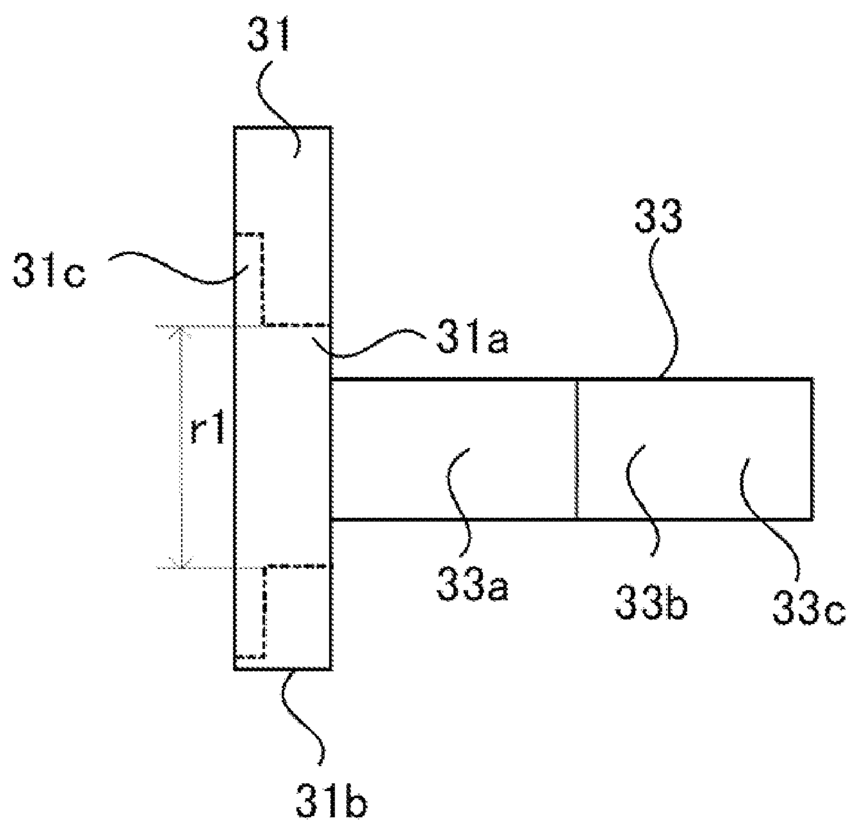
FIG. 4*d* is a side view of the coupler that couples the segments.

As shown in FIG. 3, such pipe units 10 are sequentially coupled in the longitudinal direction while the side plates 102, 103 of segments 1*a*, 1*b*, 1*c* are butted against each other. In FIG. 3, a plurality of plastic couplers 30 and plastic fixtures 50 are attached between the side plates 103 of the segments 1*a*, 1*b*, 1*c* of the pipe unit and the inner plates 106 adjacent to the side plates 103. A diameter expansion pin 11 that expands the claws of the coupler 30 is inserted through the insertion holes formed in the side plates 102, 103 and the inner plates 106, 107 of the segments to couple the segments 1*a*, 1*b*, 1*c* in the longitudinal direction via the fixture 50 and the coupler 30, as will be described later.

As shown in FIGS. 4*a* to 4*d*, the coupler 30 includes a circular substrate 31 having a circular insertion hole 31*a* with a diameter r1 formed thereon, and claws 32, 33 which are provided upright on the periphery of the insertion hole 31*a* so as to be elastically deformable in the radial direction. The diameter r1 of the insertion hole 31*a* is set to a value that allows the cylindrical diameter expansion pin 11 with a diameter d2 to pass therethrough (lower part of FIG. 5). The claws 32 and 33 are formed of plastic integrally with the substrate 31, and in this embodiment, are formed as a pair of claws disposed at positions facing in the radial direction on the periphery of the insertion hole 31*a*. It is also possible to provide a plurality of claws, three or more, spaced apart on the periphery of the insertion hole 31*a*.

The substrate 31 is formed in a disc shape with a thickness t2 having a diameter r2 larger than the diameter r1 of the insertion hole 31*a* and having flat surfaces on both sides. A portion of the substrate 31 is cut to form a cut surface 31*b* in order to align the height of the insertion hole 31*a* of the substrate 31 with the height of the insertion hole 103*a* (102*a*) of the side plate 103 (102) of the segment, although it is not necessary to cut when the heights are the same. A ring-shaped recess 31*c* which has a diameter larger than the diameter r1 of the insertion hole 31*a* and into which the fixture 50 is fitted is formed on the rear surface of the substrate 31. Although the substrate 31 has a circular shape in this embodiment, it may have a rectangular shape.

The claws 32 and 33 are plane-symmetrical with respect to a vertical plane s1 (FIG. 4*b*) passing through the center of the insertion hole 31*a* and have a rectangular cross section. The claws 32 and 33 include flat portions having flat surfaces 32*a* and 33*a* on their facing surfaces and opposite side surfaces, and include curved portions having flat sloping surfaces 32*b*, 33*b* that rise from the flat surfaces 32*a*, 33*a* and slope away from each other, and having flat sloping surfaces 32*c*, 33*c* that continuously slope in the opposite direction.

Figure 5:
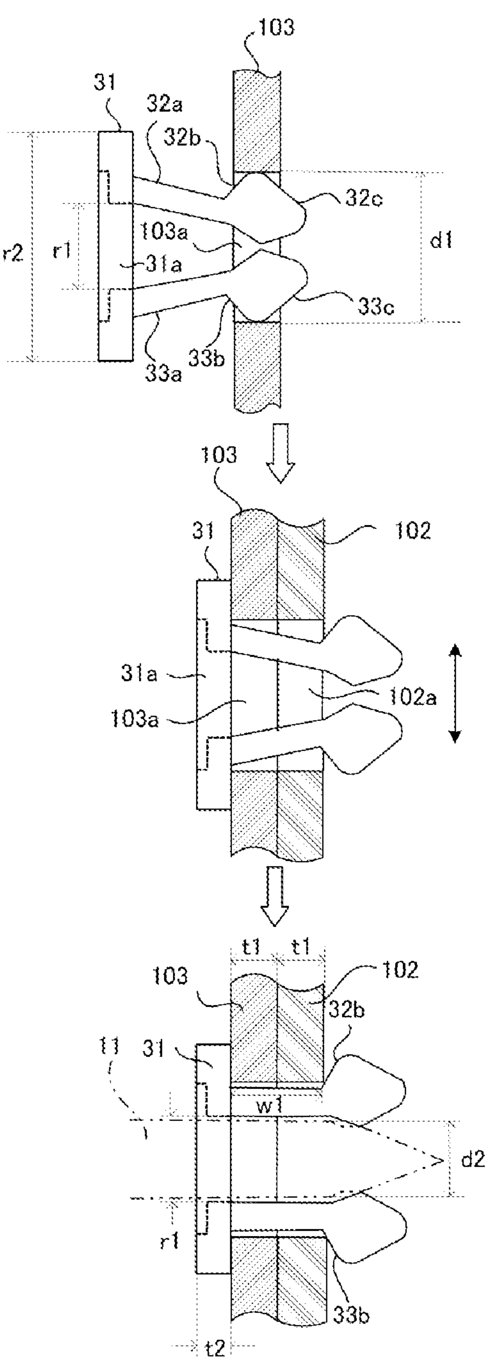
FIG. 5 is an illustrative view showing a state in which claws of the coupler are elastically deformed.

The length w1 of the flat surfaces 32*a*, 33*a* (the length extending in the longitudinal direction from the substrate surface) is set to twice (2×t1) or a slightly smaller value than the side plates 103, 102 of the butted segments (lower part of FIG. 5). The length w2 of the curved portion is set to a value of approximately (⅔)×w1 in this embodiment. The length w1+w2 of the claws 32, 33 of the coupler 30 from the substrate 31 is set to a value such that the claws 32, 33 protrude and extend into the side plate 102 through the insertion holes 103*a*, 102*a* of the side plates 103, 102 of the butted segments.

The coupler 30 is made of an elastically deformable plastic material, for example, rigid polyvinyl chloride (PVC), which is the same material as the segment 1. FIG. 5 shows a state in which the claws 32 and 33 of the coupler 30 are elastically deformed in the radial direction of the insertion hole 31*a*. The diameter r2 of the substrate 31 of the coupler 30 is larger than the diameter d1 of the insertion hole 102*a* (103*a*) of the side plate 102 (103) of the segment, so that the substrate 31 cannot pass through the insertion hole 102*a* (103*a*). However, the claws 32, 33 are designed so that they are, as shown in the upper part of FIG. 5, elastically deformed in the approaching direction and can be inserted into the insertion hole 102*a* (103*a*) of the side plate 102 (103).

On the other hand, the diameter expansion pin 11 is, as shown in the lower part of FIG. 5, inserted into the insertion hole 31*a* of the substrate 31 and between the claws 32 and 33 from a state in which the claws 32 and 33 are inserted through the insertion holes 102*a* (103*a*), as shown in the middle part of FIG. 5. The claws 32 and 33 are then elastically deformed in a diameter-expanding direction, and the sloping surfaces 32*b*, 33*b* of the claws 32, 33 that protrude from the side plate 102 press the side plate 102 against the side plate 103 to firmly clamp both the side plates 102, 103.

Figure 6:
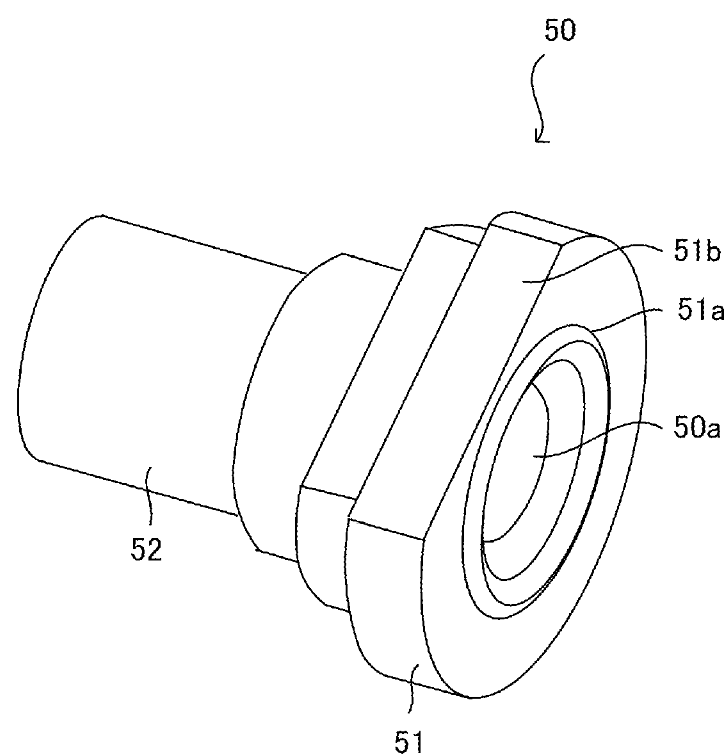
FIG. 6 is a perspective view showing a fixture that fixes the coupler to the segment.
Figure 7A:
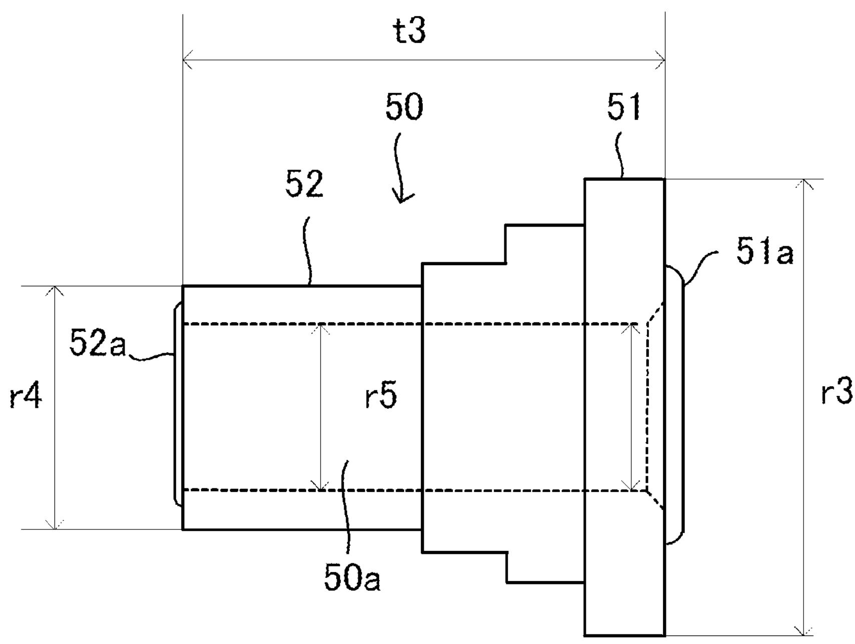
FIG. 7*a* is a top view of the fixture.
Figure 7B:
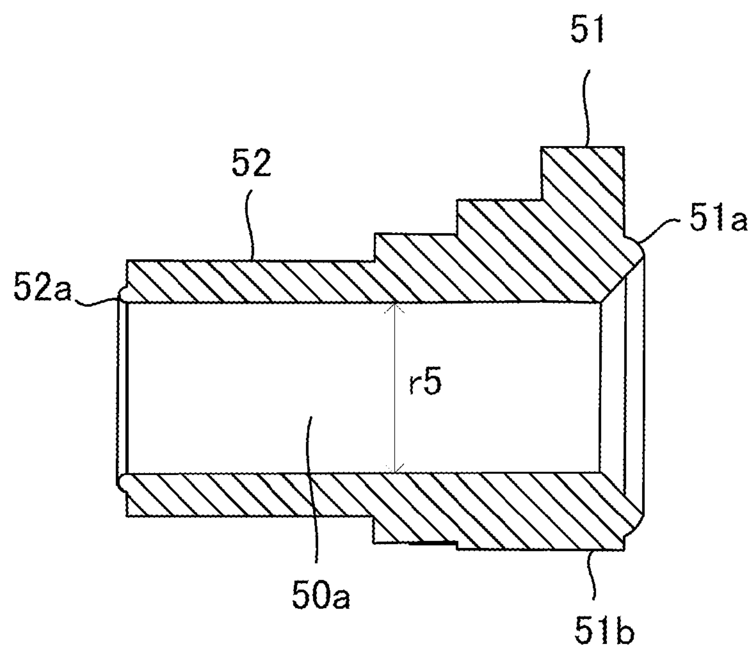
FIG. 7*b* is a side sectional view of the fixture.

The fixture 50 is a tool for fixing the coupler 30 to the side plate 103 of the segment and is illustrated in FIGS. 6, 7*a* and 7*b*. The fixture 50 includes a cylindrical portion 51 having an outer diameter r3, a cylindrical portion 52 having an outer diameter r4 smaller than r3, and cylindrical portions each having a different diameter between the cylindrical portions 51 and 52. A cylindrical insertion hole 50*a* is formed which has a diameter r5 and through which the diameter expansion pin 11 is inserted.

The diameter r3 of the cylindrical portion 51 is set to the same diameter as the diameter r2 of the substrate 31 of the coupler 30, and the diameter r5 of the insertion hole 50*a* is set to the same diameter as the diameter r1 of the insertion hole 31*a* of the substrate 31. A ring-shaped protrusion 51*a* that fits into the recess 31*c* formed in the substrate 31 is formed on the outer surface of the cylindrical portion 51. The cylindrical portion 51 is cut at the lower portion thereof in the same manner as the substrate 31 to form a cut surface 51*b*. The protrusion 51*a* of the cylindrical portion 51 is fitted into the recess 31*c* of the substrate 31 to allow both the members to be connected flush.

The diameter r4 of the cylindrical portion 52 is larger than the diameter of the insertion hole 106*a* of the inner plate 106, and has a value that prevents the cylindrical portion 52 from passing through the insertion hole 106*a*. On the other hand, the cylindrical portion 52 is provided at an end surface thereof with a small-diameter ring-shaped protrusion 52*a* that is fitted into the insertion hole 106*a*.

Figure 8:
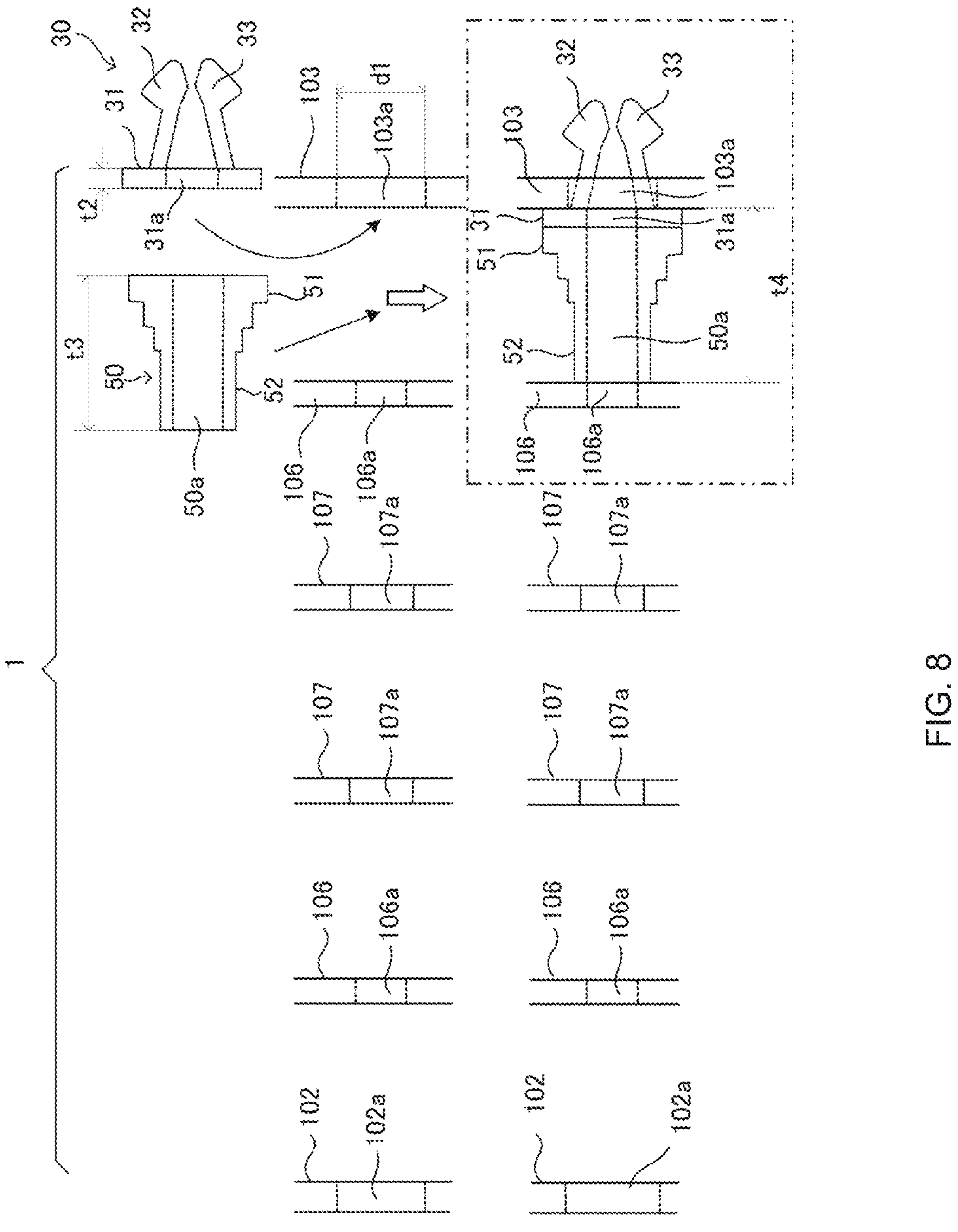
FIG. 8 is an illustrative view showing a process of fixing the coupler to the side plate of the segment.

As shown in FIGS. 7*a* and 8, the fixture 50 has a length t3 in the longitudinal direction, and a value t2+t3 obtained by adding t3 and the thickness t2 (length in the longitudinal direction) of the substrate 31 of the coupler 30 is set to a value corresponding to the distance t4 between the side plate 103 and the inner plate 106 of the segment. The claws 32 and 33 of the coupler 30 are inserted into the insertion hole 103*a* of the side plate 103, and the fixture 30 is, as shown in the upper part of FIG. 8, press-fitted so that the protrusion 51*a* of the cylindrical portion 51 is fitted into the recess 31*c* of the substrate 31 and the protrusion 52*a* of the cylindrical portion 52 is fitted into the insertion hole 106*a* of the inner plate 106. This allows the coupler 30 to be fixed to the side plate 103. In this state, the centers of the insertion holes 102*a*, 103*a* of the side plates 102 and 103, the insertion hole 106*a* of the inner plate 106, the insertion hole 50*a* of the fixture 50, and the insertion hole 31*a* of the coupler are aligned with each other to allow the diameter expansion pin 11 to be inserted therethrough.

The fixture 50 is integrally formed by injection molding using rigid polyvinyl chloride (PVC), which is the same material as the segment 1. The material is not limited to rigid polyvinyl chloride, but may be a resin material that can withstand the strong alkaline component of the filler, for example, ABS resin, polypropylene (PP), or nylon.

In such a configuration, a process of coupling the segments in the longitudinal direction will be described. As shown in FIGS. 5 and 8, the claws 32 and 33 of the coupler 30 are elastically deformed and inserted into the insertion holes 103*a* of the side plates 103 of the segment 1. When the claws 32 and 33 are inserted until the substrate 31 contacts the side plate 103, the claws 32 and 33 protrude outside the side plate 103. In this state, the fixture 50 is press-fitted so that the projection 51*a* of the cylindrical portion 51 fits into the recess 31*c* of the substrate 31 and the projection 52*a* of the cylindrical portion 52 fits into the insertion hole 106*a* of the inner plate 106. This allows the coupler 30 to be fixed to the side plate 103, as shown in the lower part of FIG. 8 and the upper part of FIG. 9.

Figure 9:
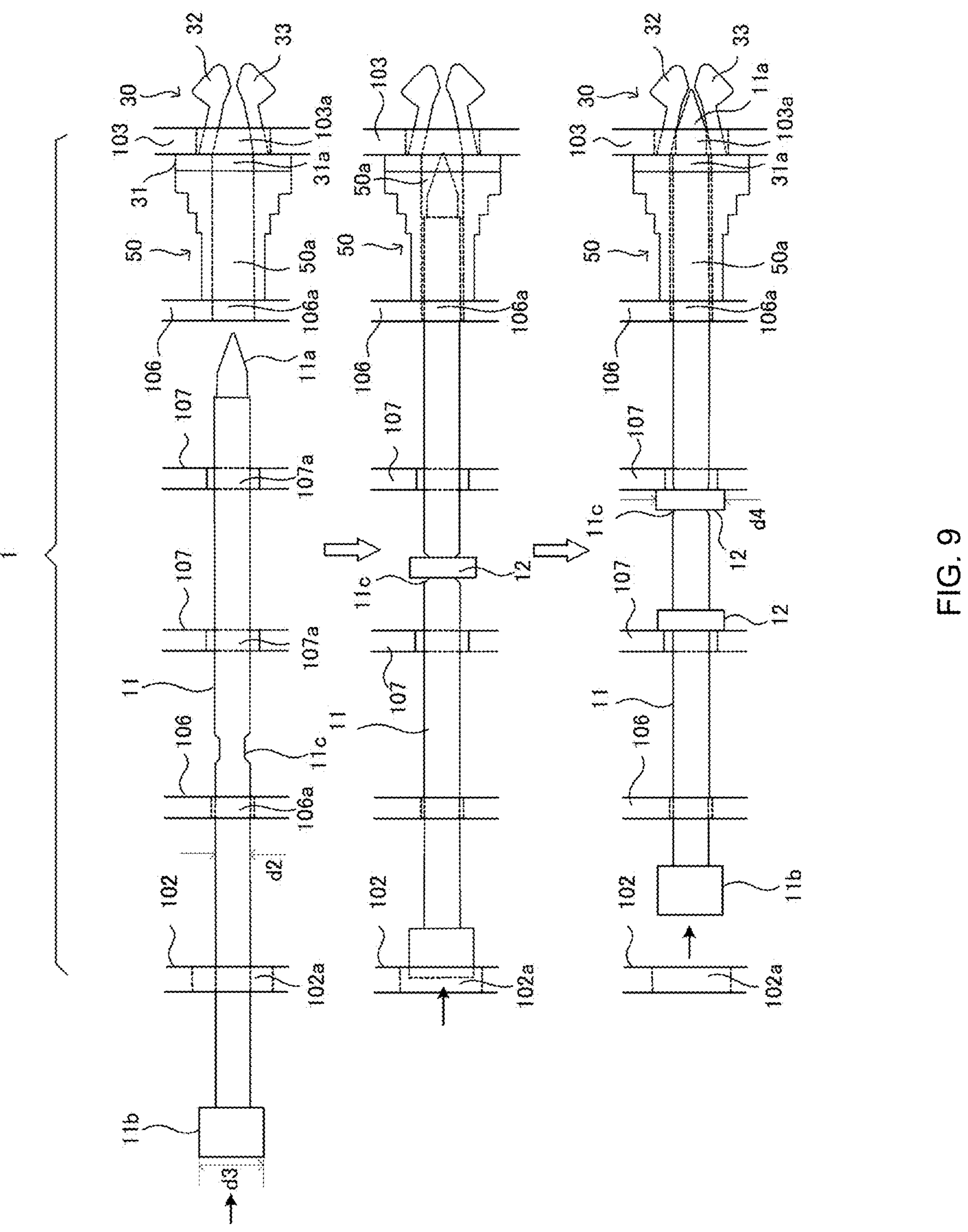
FIG. 9 is an illustrative view showing a process of attaching to the segment a diameter expansion pin that expands the diameter of the claws of the coupler.

Subsequently, the diameter expansion pin 11 is attached to the segment 1, as shown in FIG. 9. The diameter expansion pin 11 has a cylindrical shape having a diameter d2 with the front end 11*a* thereof formed conical and tapered. The diameter expansion pin 11 has at the rear end a cylindrical head portion 11*b* whose diameter d3 is set such that the diameter expansion pin 11 can pass through the insertion hole 102*a* of the side plate 102 but cannot pass through the insertion hole 106*a* of the inner plate 106.

Figure 10:
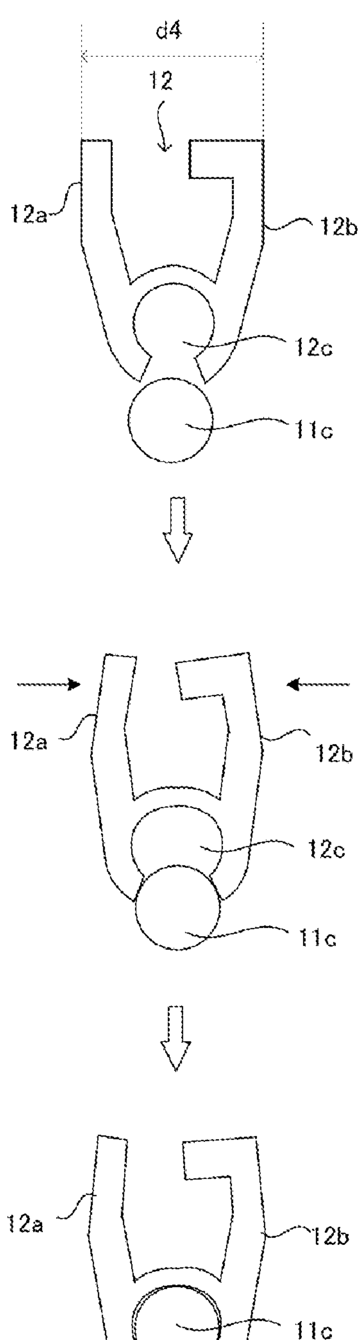
FIG. 10 is an illustrative view showing a process in which a fall prevention member that prevents the diameter expansion pin from falling off from the segment is attached to the diameter expansion pin.

A small-diameter portion 11*c* is formed along the circumference of the diameter expansion pin 11 at substantially the center thereof in the longitudinal direction. As shown in the middle of FIG. 9, when the diameter expansion pin 11 passes through the insertion holes of the side plate 102 and the inner plates 106 and 107 and the front end 11*a* is inserted through the insertion hole 50*a* of the fixture 50, the small-diameter portion 11*c* receives a clip-shaped fall prevention member 12, as shown in FIG. 10, that prevents the diameter expansion pin 11 from falling off from the segment.

The fall prevention member 12 is made of elastically deformable plastic, and has legs 12*a* and 12*b* with a width d4 at the top. The fall prevention member 12 has an open hollow portion 12*c* at its lower portion, and is attached to the diameter expansion pin 11 by inserting the small-diameter portion 11*c* into the hollow portion 12*c*. Even if the diameter expansion pin 11 moves in the longitudinal direction, the fall prevention member 12 contacts the inner plate 107 to prevent the diameter expansion pin 11 from falling off from the segment.

As shown in the lower part of FIG. 9, the diameter expansion pin 11 is further inserted and the fall prevention member 12 comes into contact with the inner plate 107. In this state, the front end 11*a* of the diameter expansion pin 11 is not yet inserted so far as to expand the diameter of the claws 32 and 33 of the coupler 30. In this state, another fall prevention member 12 is attached so as to contact the inner plate 107.

The width d4 between the legs 12*a* and 12*b* of the fall prevention member 12 is set to a value larger than the diameter of the insertion holes 106*a* and 107*a* of the inner plates 106 and 107, so that the fall prevention member 12 cannot pass through the insertion holes 106*a* and 107*a*. The diameter expansion pin 11, the coupler 30 and the fixture 50 are thus fixed to the segment 1 in this state.

Figure 13:
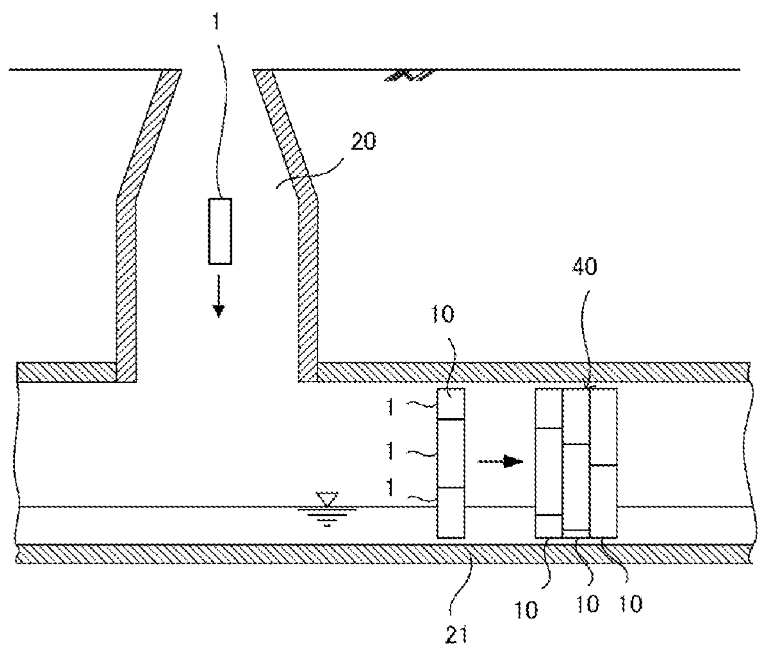
FIG. 13 is an illustrative view showing a state in which a pipe unit is assembled to install a rehabilitation pipe inside an existing pipe.

The steps described above are performed, for example, in a delivery factory before being transported to a construction site where a rehabilitation pipe is installed. As shown in FIG. 13, the segment 1 to which the diameter expansion pin 11, the coupler 30 and the fixture 50 are attached is transported to the construction site. The pipe unit 10 is assembled inside a manhole 20, and the segments of the pipe unit 10 is coupled to the segments of the pipe unit that has already coupled in the longitudinal direction.

Figure 11:
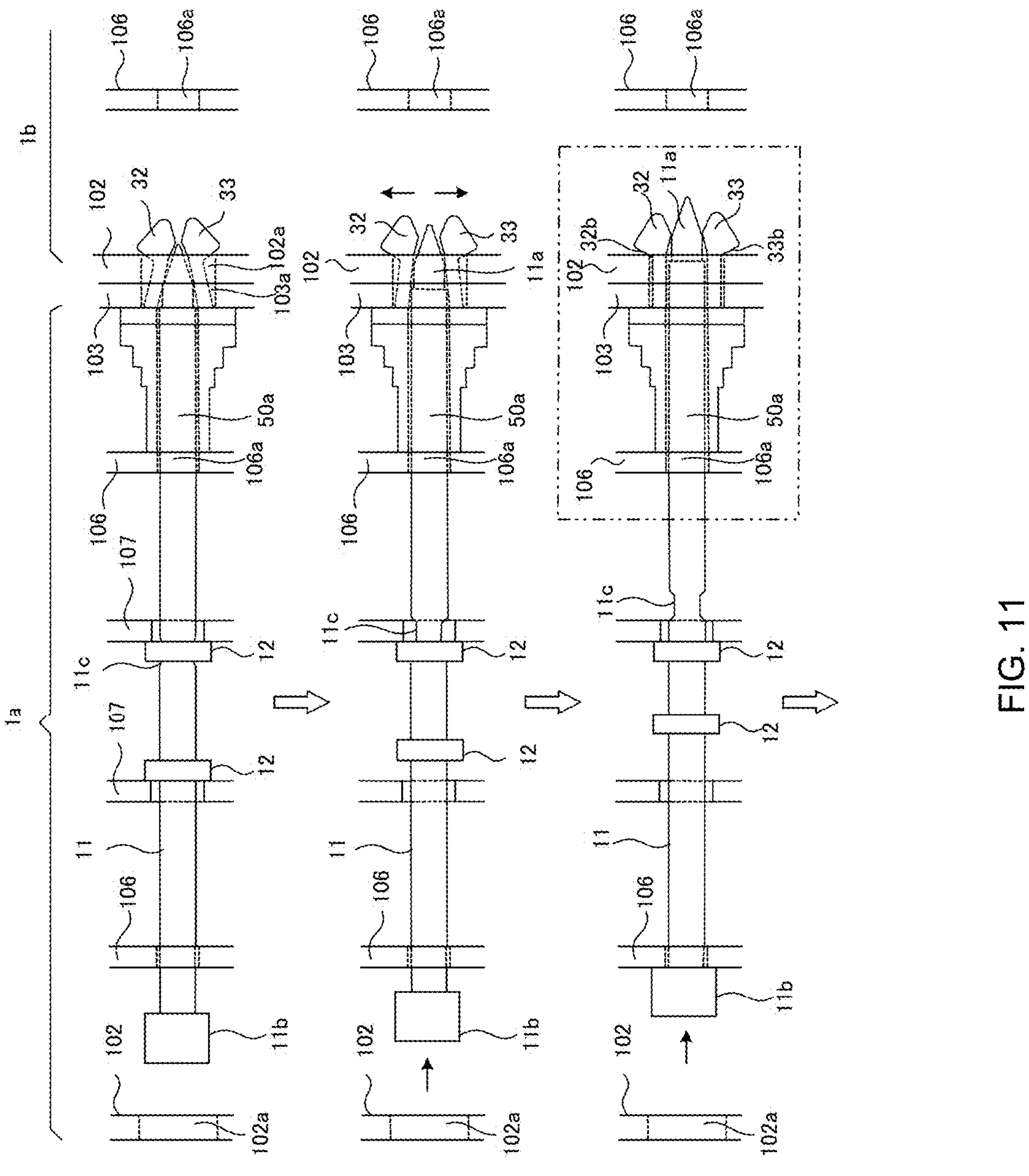
FIG. 11 is an illustrative view showing a process of expanding the claws of the coupler to couple the segments.
Figure 12A:
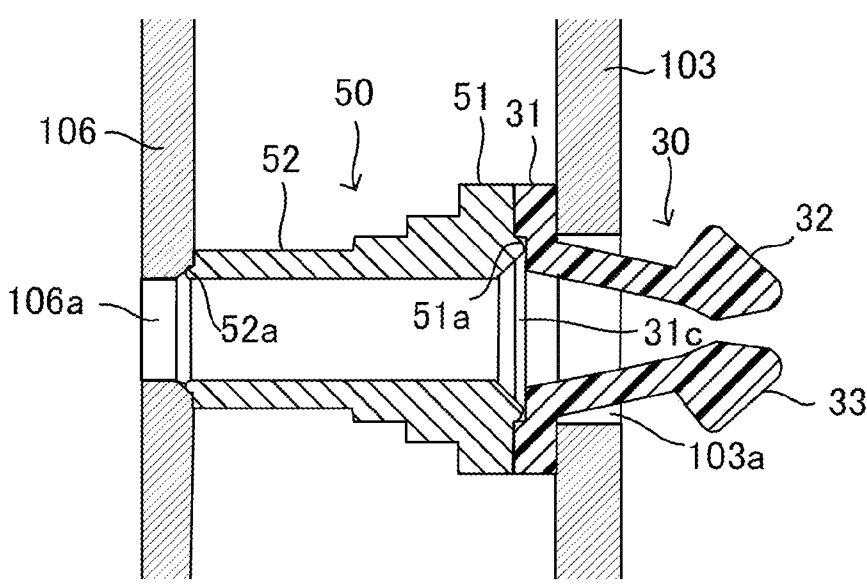
FIG. 12*a* is a cross-sectional view of a portion shown in phantom in FIG. 8.
Figure 12B:
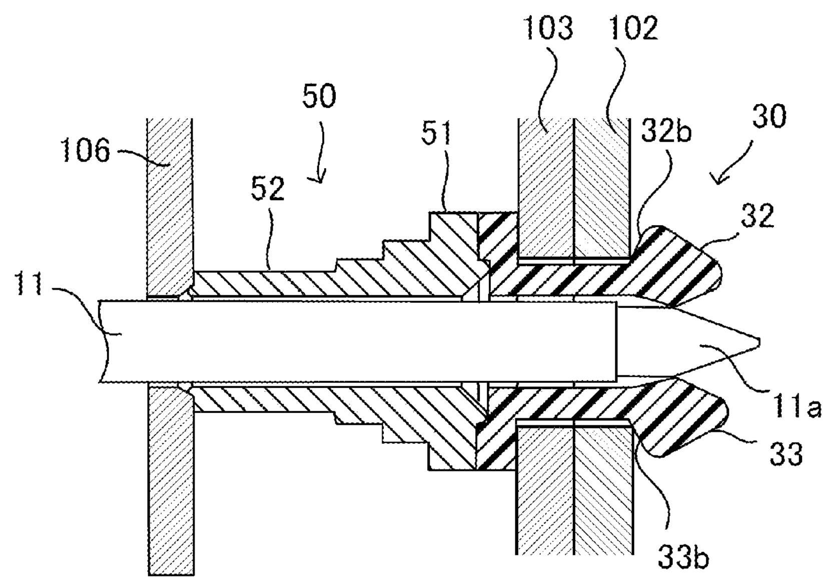
FIG. 12*b* is a cross-sectional view of a portion shown in phantom in FIG. 11.

FIG. 11 shows a state in which one segment of a newly assembled pipe unit is designated as 1*a* and one segment of a pipe unit already coupled in the longitudinal direction is designated as 1*b*, and both the segments are coupled in the longitudinal direction. The coupler 30, the fixture 50 and the diameter expansion pin 11 that are attached to the segment 1*a* are in a delivery state as shown in the lower part of FIG. 9 and don't fall off from the segment 1*a* during transportation to the construction site.

In this state, as shown in the upper part of FIG. 11, the claws 32, 33 protruding from the side plate 103 of the segment 1*a* are inserted into the insertion hole 102*a* of the side plate 102 of the segment 1*b*. Both the side plates 103*a*, 102*a* are butted against each other and the claws 32 and 33 are pushed into the side plate 102 of the segment 1*b*. The claws 32 and 33 are elastically deformed in a diameter-reducing direction, so that the claws 32 and 33 can smoothly pass through the insertion hole 102*a* and protrude into the side plate 102 of the segment 1*b*.

Subsequently, as shown in the middle part of FIG. 11, the diameter expansion pin 11 is pushed in against the frictional resistance of the fall preventing member 12, and the front end 11*a* thereof is inserted between the claws 32, 33, which are then expanded in diameter. As shown in the lower part of FIG. 11, the diameter expansion pin 11 is pushed in until the head portion 11*b* thereof abuts against the inner plate 106 adjacent to the side plate 102. The sloping surfaces 32*b*, 33*b* of the claws 32, 33 press the side plate 102 of the segment 1*b* against the side plate 103 of the segment 1*a* to clamp both the side plates, thereby firmly coupling both the segments 1*a*, 1*b* in the longitudinal direction.

The sloping surfaces 32*b*, 33*b* of the claws 32, 33 of the coupler 30 are inclined such that the force for clamping the side plates 102, 103 increases as the diameter of the claws 32, 33 expands. By changing the shape of the front end 11*a* of the diameter expansion pin 11 or the shape of the claws 32, 33 that contacts the front end 11*a* thereof, the clamping force can be increased to couple the segments more firmly. Furthermore, the diameter expansion pin 11 can be pulled out, so that the coupled segments 1*a* and 1*b* can be disassembled.

FIG. 3 shows a state in which three segments 1*a*, 1*b*, and 1*c* are coupled in the longitudinal direction. A plurality of couplers 30 are attached to each segment, and are attached so as to be shifted in the circumferential direction from the couplers attached to the adjacent segments. Such an arrangement can make the coupling force in the circumferential direction uniform.

The segments of the pipe unit are thus coupled in the longitudinal direction to the segments of other pipe units that have already been coupled. This allows the pipe units to be coupled to any length in the longitudinal direction to install a rehabilitation pipe 40 inside an existing pipe 21. When the rehabilitating pipe 40 reaches a predetermined length, a filler is injected between the outer circumference of the rehabilitating pipe 40 and the inner wall surface of the existing pipe 21 to integrate the rehabilitation pipe and the existing pipe.

In this embodiment, the coupler 30 is attached to the segment via the fixture 50 prior to transportation to the construction site, and the diameter expansion pin 11 is ready to expand the diameter of the claws 32 and 33 of the coupler 30. Therefore, at the construction site, it is only necessary to abut the side plate of the segment of a new pipe unit with the side plate of the segment of an existing pipe unit and expand the diameter of the claws 32 and 33, which significantly reduces the construction time at the site.

The fixture 50 and the diameter expansion pin 11 can be made of metal, but making them of plastic may achieve weight reduction. Furthermore, the fixture 50 has a shape in which cylindrical members with different diameters are connected to each other, but it may be a cylindrical member having the same diameter as a whole, or may have a rectangular parallelepiped shape with a rectangular cross section.

DESCRIPTION OF SYMBOLS

- 1 segment
- 10 pipe unit
- 11 diameter expansion pin
- 12 fall prevention member
- 20 manhole
- 21 existing pipe
- 30 coupler
- 31 substrate
- 32, 33 claw
- 40 rehabilitation pipe
- 50 fixture
- 101 inner surface plate
- 102, 103 side plate
- 104, 105 end plate
- 106, 107 inner plate

The invention claimed is:

1. A pipe rehabilitation method in which segments each including an inner surface plate, side plates that are provided upright on both sides extending in the circumferential direction of the inner surface plate and have insertion holes formed thereon, and inner plates that are provided upright on the upper surface of the inner surface plate inside the side plates and have insertion holes formed thereon are coupled in the longitudinal direction while the side plates of the segments are butted against each other to install a rehabilitation pipe inside an existing pipe, the method comprising:

preparing a coupler having a plurality of claws that are radially elastically deformable and long so as to protrude through the insertion holes of the side plates of the butted segments;

fixing the coupler to one segment so that the claws pass through the insertion hole of the side plate of the one segment and protrude to the outside;

inserting the claws of the coupler projecting from the side plate of the one segment into the insertion hole of the side plate of the other segment that is butted against the one segment, the side plates of both the segments being butted together to protrude the claws of the coupler into the other segment;

elastically deforming the claws of the coupler protruding into the other segment to expand the claws in diameter; and pressing the side plate of the other segment against the side plate of the one segment by the claws of the coupler whose diameter has been expanded to clamp both the side plates and couple the one and the other segments in the longitudinal direction, wherein in expanding the diameter of the claws, a diameter expansion pin is used that is inserted between the claws of the coupler and elastically deforms the claws.

2. A pipe rehabilitation method according to claim 1, wherein the claw of the coupler has a curved portion whose tip curves outward, and the surface opposite to the tip of the curved portion forms an inclined surface, which presses against the side plate of the other segment when the claw expands in diameter.

3. A pipe rehabilitation method according to claim 1, wherein the coupler includes a substrate having an insertion hole through which the diameter expansion pin can pass, and a pair of claws disposed at positions facing each other in the radial direction on the periphery of the insertion hole of the substrate.

4. A pipe rehabilitation method according to claim 3, wherein the coupler is fixed to the side plate of the segment by a fixture having an insertion hole through which the diameter expansion pin can pass.

5. A pipe rehabilitation method according to claim 4, wherein the segment is transported to a construction site with the coupler, the fixture and the diameter expansion pin attached thereto.

6. A pipe rehabilitation method according to claim 4, wherein the coupler, the fixture and the diameter expansion pin are made of plastic.

7. A pipe rehabilitation method according to claim 1, wherein the diameter expansion pin is inserted through the insertion hole of the side plate on the side opposite to the side plate to which the coupler is fixed.

8. A pipe rehabilitation method according to claim 7, wherein the diameter expansion pin has at its end a head portion with a diameter that can pass through the insertion hole of the side plate but cannot pass through the insertion hole of the inner plate.

9. A pipe rehabilitation method according to claim 8, wherein the claws of the coupler expand in diameter to press the side plate of the other segment against the side plate of the one segment when the head portion of the diameter expansion pin abuts against the inner plate adjacent to the side plate on the opposite side.

10. A pipe rehabilitation method according to claim 1, wherein a fall prevention member that prevents the diameter expansion pin from falling off from the segment is attached to the diameter expansion pin.

* * * * *